United States Patent
Koh et al.

(10) Patent No.: US 9,238,405 B2
(45) Date of Patent: Jan. 19, 2016

(54) MOTOR UNIT AND GRILL SHUTTER DRIVING DEVICE INCLUDING THE SAME

(71) Applicants: O&K TECHNOLOGY CO., LTD., Incheon (KR); KOREA ELECTRONICS TECHNOLOGY INSTITUTE, Seongnam-si, Gyeonggi-do (KR)

(72) Inventors: Siyurn Koh, Seoul (KR); Jungwoo Koh, Seoul (KR); Byungdae Choi, Incheon (KR); Wanyoung Park, Seoul (KR); Junghyuk Lim, Bucheon-si (KR); Sungbok Chae, Gunsan-si (KR); Sehyun Rhyu, Bucheon-si (KR); Jeongjong Lee, Incheon (KR); Bongwan Gu, Bucheon-si (KR); Junhyuk Choi, Bucheon-si (KR)

(73) Assignees: O&K TECHNOLOGY CO., LTD., Incheon (KR); KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/408,716

(22) PCT Filed: Oct. 25, 2012

(86) PCT No.: PCT/KR2012/008825
§ 371 (c)(1),
(2) Date: Dec. 17, 2014

(87) PCT Pub. No.: WO2013/191330
PCT Pub. Date: Dec. 27, 2013

(65) Prior Publication Data
US 2015/0197147 A1    Jul. 16, 2015

(30) Foreign Application Priority Data

Jun. 18, 2012 (KR) .................. 10-2012-0065007

(51) Int. Cl.
| | |
|---|---|
| B60K 11/00 | (2006.01) |
| B60K 11/08 | (2006.01) |
| H02K 3/28 | (2006.01) |
| H02K 29/03 | (2006.01) |
| H02K 1/14 | (2006.01) |

(52) U.S. Cl.
CPC .............. *B60K 11/085* (2013.01); *H02K 1/146* (2013.01); *H02K 3/28* (2013.01); *H02K 29/03* (2013.01)

(58) Field of Classification Search
CPC ........................................................ B60K 11/08
USPC .................................................. 180/68.1–68.6
See application file for complete search history.

(56) References Cited

U.S. PATENT DOCUMENTS

| | | | | |
|---|---|---|---|---|
| 3,575,622 | A | * 4/1971 | Nielson et al. ................. | 310/166 |
| 4,715,532 | A | 12/1987 | Sarazen, Jr. et al. ............ | 236/49 |

(Continued)

FOREIGN PATENT DOCUMENTS

| | | |
|---|---|---|
| JP | 2002-064949 A | 2/2002 |
| JP | 2009-065823 A | 3/2009 |
| JP | 2009-118611 A | 5/2009 |

OTHER PUBLICATIONS

International Search Report dated Feb. 28, 2013 issued in Application No. PCT/KR2012/008825 (Original Search Report and English Translation).

*Primary Examiner* — John Walters
*Assistant Examiner* — James Triggs
(74) *Attorney, Agent, or Firm* — Ked & Associates, LLP

(57) ABSTRACT

A motor unit and a grill shutter driving device are disclosed. The grill shutter driving device according to an exemplary embodiment of the present inventive concept includes a body unit interposed between a plurality of grill shutters, a motor unit installed inside the body unit for generating driving power to drive the grill shutter, a control unit for controlling generation of driving power of the motor unit, and a connection unit for providing driving power of the motor unit to the grill shutter. The motor unit includes a plurality of coil units in which electric coil is rolled, a stator to be magnetized, a rotator having magnetism with a permanent magnet and rotating due to interference of the magnetization of the stator, wherein the plurality of coil units are separated with each other in a radial form with even number, and any one side of the mutually facing coil units includes electric coil rolled in, thereby forming an asymmetry coil structure.

13 Claims, 7 Drawing Sheets

(56) References Cited

U.S. PATENT DOCUMENTS

| | | | |
|---|---|---|---|
| 5,173,651 A * | 12/1992 | Buckley et al. | 318/701 |
| 6,213,734 B1 * | 4/2001 | Imhof et al. | 417/356 |
| 6,879,079 B2 | 4/2005 | Vollmer | 310/254 |
| 8,446,121 B1 * | 5/2013 | Parsa et al. | 318/538 |
| 2005/0147512 A1 * | 7/2005 | Chen et al. | 417/423.12 |

* cited by examiner

20

(a)

(b)

(a)

(b)

MOTOR UNIT AND GRILL SHUTTER DRIVING DEVICE INCLUDING THE SAME

CROSS-REFERENCE TO RELATED PATENT APPLICATIONS

This application is a U.S National Stage Application under 35 U.S.C. §371 of PCT Application No. PCT/KR2012/008825, filed Oct. 25, 2012, which claims priority to Korean Patent Application No. 10-2012-0065007, filed Jun. 18, 2012, whose entire disclosures are hereby incorporated by reference.

TECHNICAL FIELD

Example embodiments of inventive concepts relate to a motor unit and a grill shutter driving device including the same, and more particularly, to a motor unit which is capable of contributing to efficiency improvement according to process simplification and a grill shutter device including the same.

BACKGROUND ART

Air input inside a motor during drive prevents overheating while the air exchanges heat with engine cooling water in the radiator. However, the air input during drive works as resistance, accordingly, it causes energy loss. Thus, air input from outside may be shut off at the point of cooling not required by installing a grill shutter which is capable of being opened and shut selectively and an actuator for the operation of the grill shutter at the rear side of the front bumper which is front at the driving direction basis.

Meanwhile, the actuator applies a motor including both a stator and a rotator. However, such the actuator has a problem in controlling detail position and low responsiveness in response to shaking in high-speed driving. In addition, the process of interposing electric coil to a stator is complicated, thereby causing degenerating efficiency.

DETAILED DESCRIPTION OF THE INVENTION

Technical Goal of the Invention

According to an exemplary embodiment, the inventive concept provides a motor unit which is capable of contributing to efficiency improvement according to process simplification and a grill shutter driving device including the same.

Technical Solution of the Invention

According to an exemplary embodiment of the inventive concept, a motor unit includes a plurality of coil units in which electric coil is rolled and a magnetized stator. The motor unit also includes a permanent magnetic such that it may have magnetism and a rotator rotating due to the magnetized stator. At this time, the plurality of coil units are separated with each other in mutual radial form with even number, which are a plurality of first coil units separated from each other and not having electric coil rolled in and a plurality of second coil units longer than the first coil unit, being disposed between the first coil units, and having electric coil rolled in.

The stator has a form that the first coil unit and the second coil unit being projected from the boundary unit which outermost is a circle and has a hallow middle unit toward middle in a radial shape, wherein the width of the boundary from which the first coil unit is projected may be wider than the width of the boundary from which the second coil unit is projected.

The boundary unit connects between the first coil unit and the second coil unit and contacts the hallow middle unit, which may include a connection side extended in a vertical direction to the projecting direction of the second coil unit. At this time, the side of the first coil unit contacting the hallow middle unit includes a slot side shorter than the second coil unit, a first curve side curved and extended from the slot side into the direction of the second coil unit, a second curve side curved and extended from the first curve side so as to be parallel with the second coil unit to meet the connection side.

The first coil unit and the second coil unit may be prepared with a plural number such that each of them may be separated from each other by 120 degree angle.

The first coil unit includes two end corners facing the rotator undergone diagonal corner cutting.

According to another exemplary embodiment of the inventive concept, a grill shutter driving device includes a body unit interposed between a plurality of grill shutters. The grill shutter driving device includes a motor unit located inside the body unit and generating driving power for driving the grill shutter. The grill shutter driving device includes a control unit controlling driving power generation of the motor unit. The grill shutter driving device includes a connection unit providing driving power of the motor unit to the grill shutter. At this time, the motor unit includes a stator and a rotator. The stator includes a plurality of coil units in which electric coil is rolled and becomes to be magnetized. The rotator has magnetism with a permanent magnet and rotates by the magnetization of the stator. At this time, the plurality of coil units are prepared in a mutual radial form separated from each other with an even number and includes a plurality of first coil units not having electric coil rolled in and a plurality of second coil units having electric coil rolled in which is longer than the first coil unit. The body unit may include at least one fixing guider for fixing the location of the stator in the motor unit.

The grill shutter driving device includes a plurality of decelerating gears reducing driving power of the motor unit in multiple stages being engaged in the rotator, and the connection unit includes a first and a second connection units prepared so as to be connected with deceleration units at both sides respectively through the body unit.

The control unit may control driving power of the motor unit by comparing the temperature of the environment with which the grill shutter is equipped with the predetermined reference value.

Also, the control unit may be connected electrically with an electric conductor connected to a power source in the body unit in a press-in way.

Effect of the Invention

According to the inventive concept, a motor unit having an asymmetrical electric coil wiring structure may enable to simplify the number of parts and process and reduce cogging torque.

Also, a bearing interposed on a pivot of a stator may enable to increase durability due to load decrease and reduce operating noisy due to looseness minimization.

Also, a temperature in the environment in which a grill shutter being installed is informed to control driving power actively in real time, thereby contributing to efficiency increase.

Also, an electric conductor is connected to a control unit in a press-in way, accordingly, air hole and crack may be less generated and efficiency may be maximized due to simplified process compared to the existing soldering method.

BRIEF DESCRIPTION OF THE DRAWINGS

Exemplary embodiments of the inventive concept will be more clearly understood from the following detailed description taken in conjunction with the accompanying drawings in which.

BEST MODE FOR CARRYING OUT THE INVENTION

Various example embodiments will be described more fully hereinafter with reference to the accompanying drawings, in which some example embodiments are shown.

Figure 1:
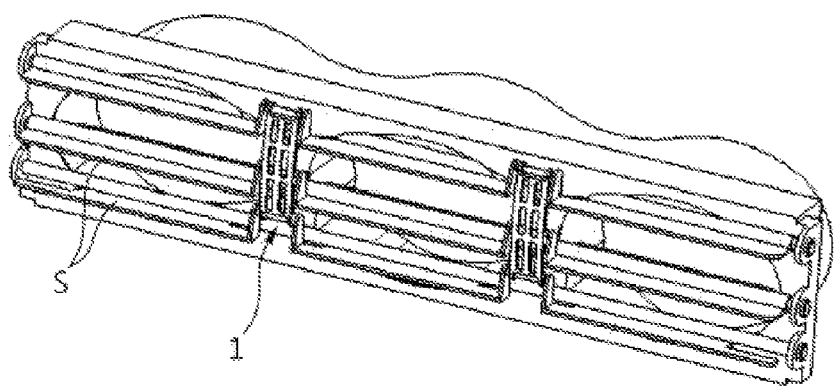
FIG. 1 is a schematic perspective view of a grill shutter driving device according to an exemplary embodiment of the inventive concept.
Figure 2:
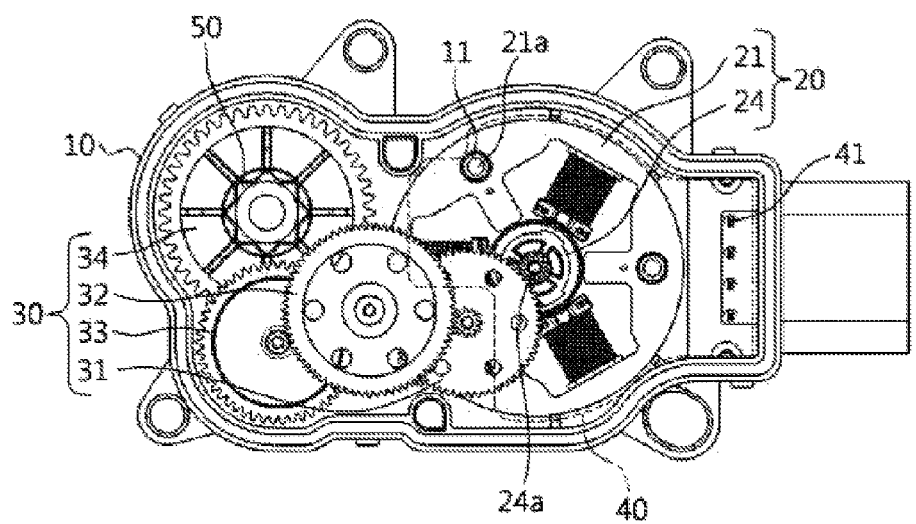
FIG. 2 is a plan view of a grill shutter driving device shown in FIG. 1.

FIG. 1 is a perspective view illustrating a grill shutter driving device 1 according to an exemplary embodiment of the inventive concept schematically, and FIG. 2 is a plan view of the grill shutter driving device 1 shown in FIG. 1.

Referring to FIGS. 1 and 2, the grill shutter driving device 1 includes a body unit 10, a motor unit 20, a decelerating unit 30, a control unit 40 and a connection unit 50.

The body unit 10 is interposed between the plurality of grill shutters S. For example, the body unit 10 is interposed on a separated place between the grill shutters S arranged side by side as shown in FIG. 1. The body unit 10 covers to protect the motor unit 20, the decelerating unit 30, and the control unit 40 will be described later.

The motor unit 20 is installed inside the body unit 10 and generates driving power for driving the grill shutter S. For this, the motor unit 20 is a motor for providing rotator power generated by a stator 21 and a rotator 24 as driving power.

Figure 3:
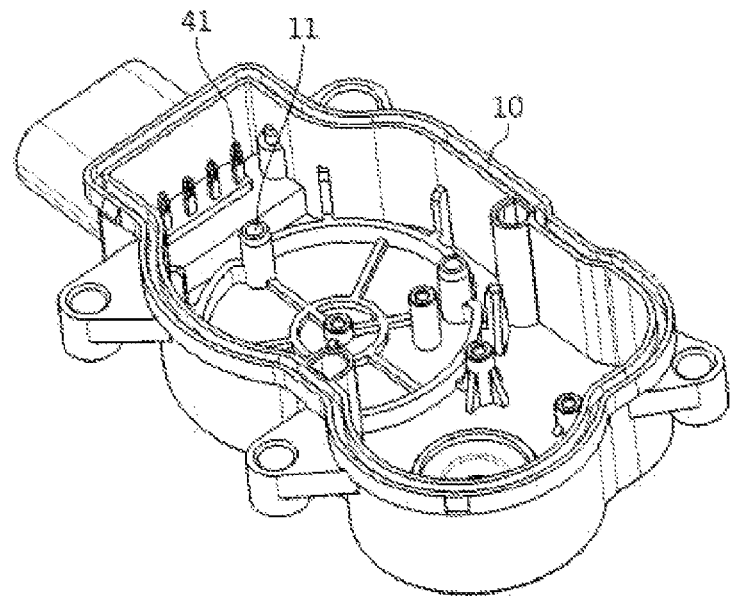
FIG. 3 is a schematic perspective view of a body unit shown in FIG. 1.

The stator 21 includes a plurality of coil units 22, 34 in which electric coil C is rolled and is magnetized by electric coil C selectively. The position of the stator 21 is fixed by at least one fixing guider 11 prepared in the body unit 10 as shown in FIG. 3 and the rotation of the stator 21 is prevented. The fixing guider 11 is a cylinder shape disposed by 120 degree distance from a pivot of the stator 21, and the stator 21 includes a fixing hole 21a which is a round hole is formed at 120 degree distance corresponding to the fixing guider 11.

Figure 4:
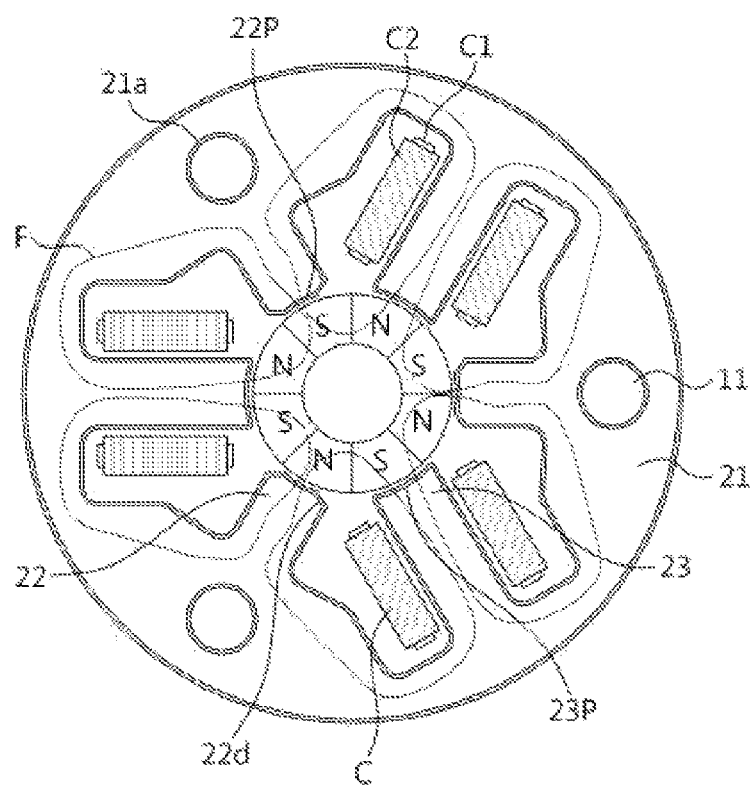
FIG. 4 is a schematic perspective view of a motor unit shown in FIG. 1.
Figure 5:
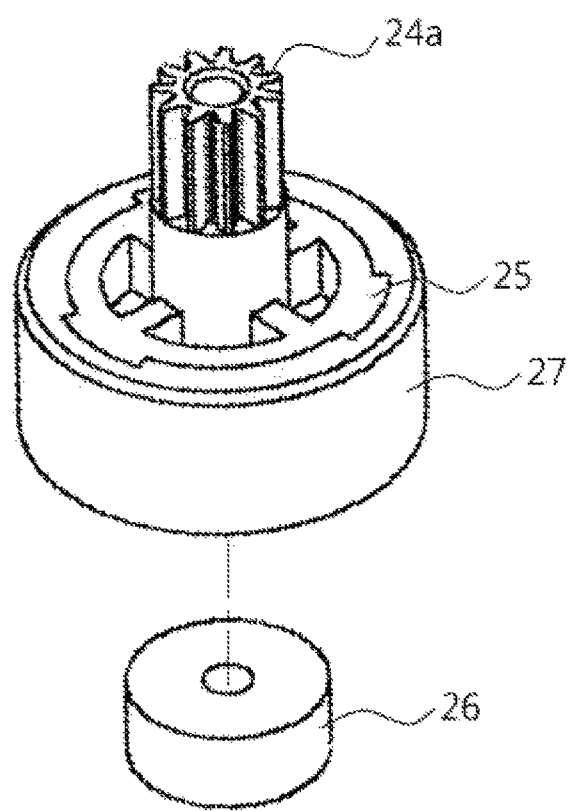
FIG. 5 is a schematic perspective view of a rotator shown in FIG. 4.
Figure 6:
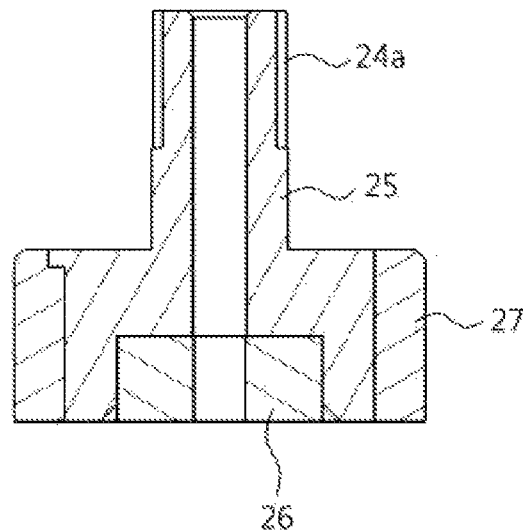
FIG. 6 is a schematic cross-sectional view of the rotator shown in FIG. 5.

The plurality of coil units 22, 23 are prepared in a mutual radial form with even number as shown in FIG. 4. More specifically, the plurality of coil units 22, 23 are divided into a plurality of first coil units 22 and second coil units 23 having a different length and separated in a mutual radial form. At this time, the first and the second coil units 22, 23 are arranged alternatively, and in addition, so as to face each other. That is, the first coil units 22 are disposed separately from each other, and the second coil units 23 are disposed between the first coil units 22, which have a longer length than the first coil unit 22.

According to an exemplary embodiment of the present inventive concept, each three of the first and the second coil units 22, 23 is arranged at 120 degree distance from each other. That is, FIG. 4 shows 8 polarities and 6 slots. However, the embodiments are not districted hereto, and the number and the distance of the first and the second coil units 22, 23 may be changeable according to the size of the stator 21.

Meanwhile, electric coil C is rolled in the second coil unit 23 having a longer length relatively between the first and the second coil units 22, 23 and faces the first coil unit 22. The stator 21 has an asymmetric form due to the different length of the first and the second coil units 22, 23, accordingly, electric coil C may be inserted only to the second coil unit 23 that has torque. Thus, the first coil unit 22 not having the electric coil C may be cut off so as to be shorter than the second coil unit 23 relatively to reduce cogging torque along with simplifying the number of parts and the process.

The electric coil C includes a coil frame C1 and coil rolled therein.

The coil frame is inserted from the side 23P facing the rotator 24 so as to wrap the second coil unit 23. The coil frame C1 may be fixed to the motor unit 20 with a way of clip combination and the like.

According to an exemplary embodiment of the present inventive concept, the side 23P facing the rotator may not be required to be wider than the middle part of the second coil unit 23 for magnetism improvement. Thus, the side of the second coil unit may not be wired, but the coil frame C1 already wired may be inserted to the second coil unit 23 instead, thereby being easier to manufacture.

Meanwhile, the first coil unit 22 may include the side 22P facing the rotator 24 which is cut off by the both ends 22d in diagonal directions. At this time, the corners may be formed by corner cutting. The corners formed by corner cutting have functions of reducing cogging torque along with the first coil unit and giving magnetism uniformly through the first coil unit and the second coil unit.

Figure 10:
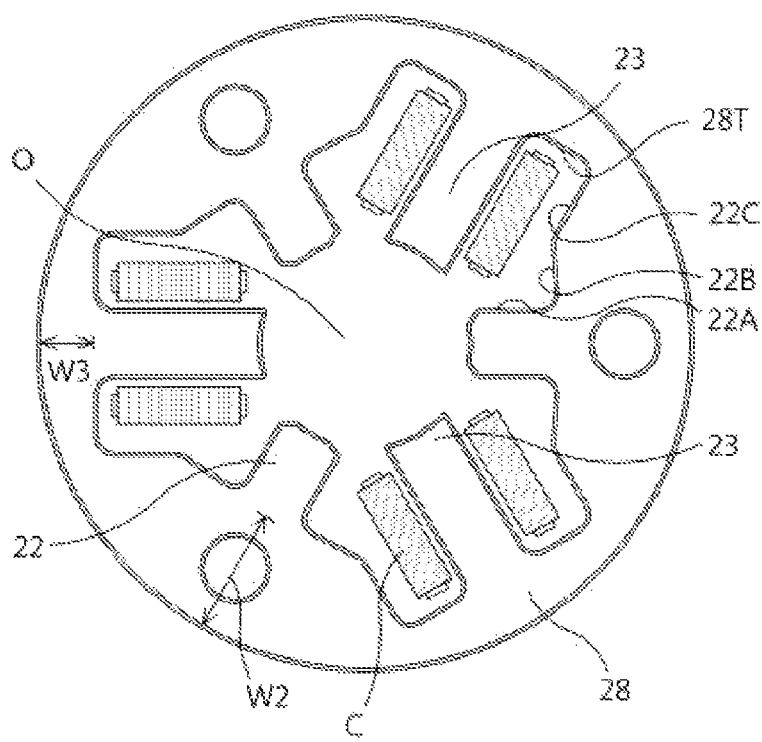
FIG. 10 is a plan view of the stator shown in FIG. 4.

As shown in FIG. 10, the coil units 22, 23 of the stator 21 have a form of projecting from a boundary unit 28 to the center, that is, the rotator. At this time, the boundary unit 28 is a circle at the outermost and has a middle hole 0 which is empty in the middle.

At this time, the width W2 of the boundary unit from which the first coil unit 22 is projected is wider than the width W3 of the boundary unit from which the second coil unit 23 is projected. That is, the distance from the rotator to the first coil unit 22 and the distance from the rotator to the second coil unit 23 are same. Thus, the width of the boundary in the first coil unit 22 needs to be wider than the one in the second coil unit 23 to make the length of the first coil unit shorter.

The boundary unit 28 includes a connecting side 28T contacting the middle hole while connecting between the first coil unit and the second coil unit. The connecting side 28T is formed in a vertical direction to the projecting direction of the second coil unit 23.

At this time, the side contacting the middle hole of the first coil unit 22 includes a slot side 22A shorter than the second coil unit 23, a first curve side 22B curved into the direction of the second coil unit 23 from the slot side 22A, and a second curve side 22C curved and extended so as to be parallel with the second coil unit 23 to meet the contacting side 28T.

At this time, the angle between the slot side 22A and the first curve side 22B is preferred to be about 90 degree.

Such the structure makes it success to reduce cogging torque and, at the same time, equalize magnetism through the first coil unit and the second coil unit.

The rotator 24 is installed on the same pivot of the stator 21 such that the rotator 24 may rotate with interference by the magnetization of the stator 21 as shown in FIGS. 2 and 4. Such the rotator 24 has magnetism with a permanent magnet, and more particularly, a permanent magnetic which is magnetized in a radial direction. Flux F is formed between the rotator 24 including a permanent magnetic and the stator 21 in which electric coil C is rolled as shown in FIG. 4, accordingly, the rotator 24 rotates to generate driving power.

Meanwhile, the rotator 24 includes a rotating rotor 25, a bearing 26 interposed on the same pivot with regards to the rotor 25, and a permanent magnetic 27 forming a magnetic ring by being installed in a radial form from the outer surface of the rotor 25. Also, the rotor 25 includes a rotating gear 24a and is connected to a decelerating unit 30 by gear assembly. The rotor 25, the bearing 26, and the permanent magnetic 27 are preferred to be formed in a series.

As the bearing 26 is arranged on the pivot of the rotor 25 which is a rotating body of the rotator 24, looseness in rotating may be minimized and rotating friction may be canceled in a certain degree by rotating in a series with the rotor degenerating durability and generating noisy due to minute floating caused by fast spin of magnetic field. Also, the bearing 26 may enable to improve rotating operation from cogging torque that may be generated when the rotor 25 rotates.

The decelerating unit 30 reduces driving power of the motor unit 20 in multiple stages. For this, the decelerating unit 30 reduces driving power of the motor unit 20 in multiple stages by including a first through a fourth decelerating gears 31, 32, 33, 34. Here, the first decelerating gear 31 engages in the rotating gear 24a, and rotation power of the rotator 24 reduces while going through the second to fourth decelerating gears 32, 33, 34 in series.

The control unit 40 controls driving power of the motor unit 20. The control unit 40 is connected to a sensor (not shown) sensing temperature of the environment in which the grill shutter S is to be installed, that is, an engine room in a motor (not shown), and controls driving power of the motor unit 20 selectively by comparing a reference value of the predetermined temperature.

Specifically, if the control unit 40 is provided with a temperature higher than the predetermined reference value, it controls generation of driving power of the motor unit 20 actively so as to open the grill shutter S. That is, the control unit 40 controls generation of driving power actively according to the condition of the grill shutter S by being provided with real time monitoring information of an engine control unit of a motor (not shown).

Figure 7:
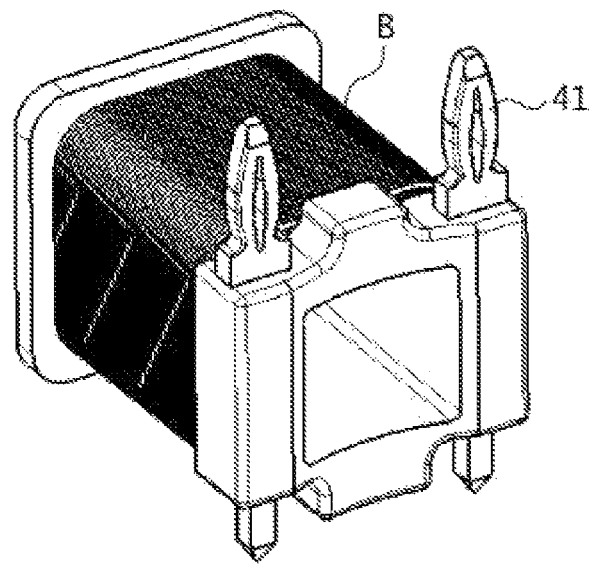
FIG. 7 is a schematic perspective view of a conductive shown in FIG. 2.

The control unit 40 is connected to a conductor 41 which is connected to a power source (not shown) prepared in the body unit 10 shown in FIG. 3 in a press-in way electrically. That is, the conductor 41 is connected to the control unit 40 in a press-in way, which soldering process is excluded, accordingly, efficiency due to process simplification may be increased as well as generation of void condition and crack, or soldering caused by soldering process being prevented. The conductor 10 includes bobbin coil B as shown in FIG. 7.

Figure 8:
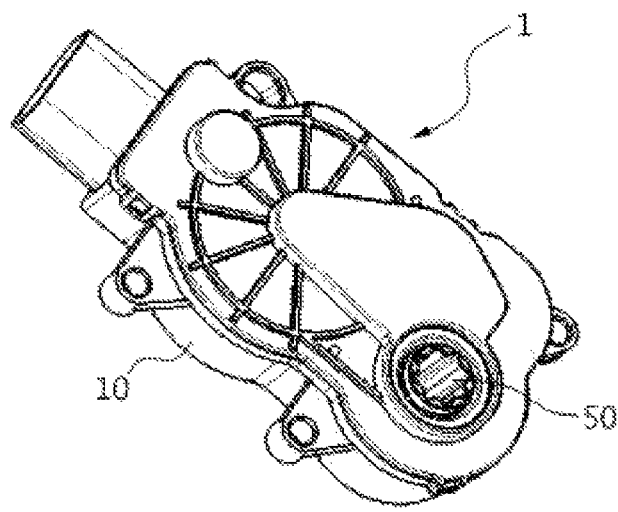
FIG. 8 is a schematic perspective view of a grill shutter driving device applying one-way connection method.
Figure 8:
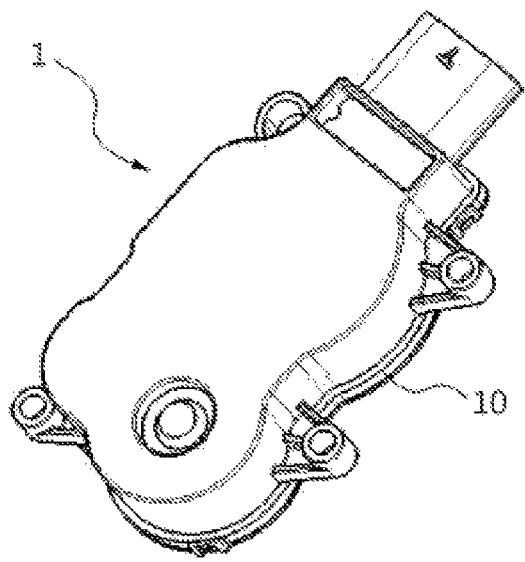
Figure 9:
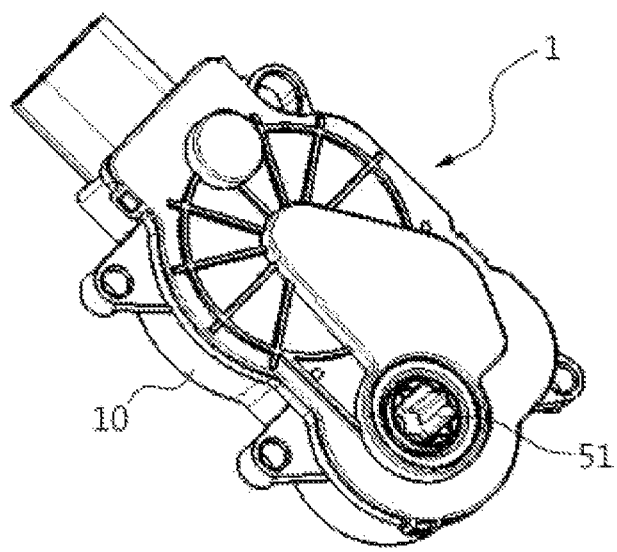
FIG. 9 is a schematic perspective view of a grill shutter driving device applying full duplex connection method.
Figure 9:
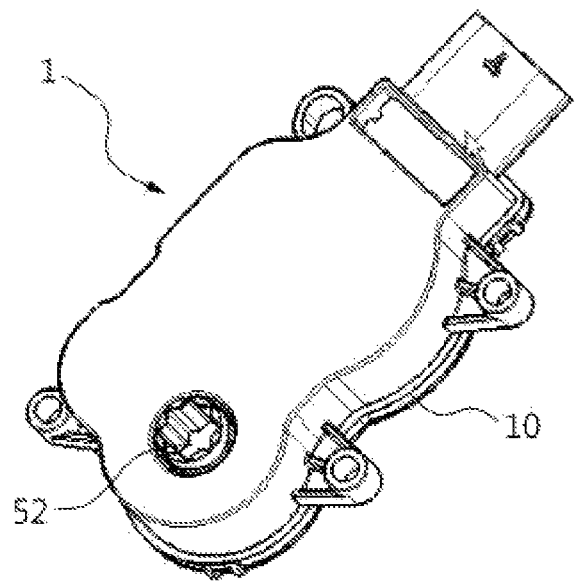

The connection unit 50 provides driving power of the motor unit 20 to the grill shutter S. Here, the connection unit 50 is connected to the deceleration unit 30 as shown in FIG. 2 and connects decelerated driving power to the grill shutter S to transmit exact driving power. Meanwhile, one side of the body unit 10 includes the connection unit 50 so as to interfere the grill shutter S as shown in FIG. 8(*a*), but the other side of the body unit 10 may not include a connection unit 50 as shown in FIG. 8(*b*), that is, one way connection method. However, the embodiments are not restricted hereto, and a connection unit 50 applying a bi-directional connection method that a first and a second connection units 51, 52 are prepared to be connected to the deceleration units 30, respectively, on both sides of the body unit 10 as shown in FIG. 9 (*a*), (*b*) may be embodied. As such, transmission of driving power may be maximized by transmitting driving power even to a terminal of structure which is relatively far from the pivot of the motor unit 20 according to the position of the connection unit 50.

According to the above structure, the grill shutter driving device 1 drives the grill shutter S by transmitting driving power generated from the motor unit 20 inside the body unit 10 and decelerated in multi step while undergoing the deceleration unit 30 to the connection unit 50. At this time, the control unit 40 controls generation of driving power of the motor unit 20 based on real-time temperature information. In addition, the connection unit 50 applies one way or bi-directional way connection method selectively according to the grill shutter S and transmits driving power of the motor unit 20.

While the present invention has been particularly shown and described with reference to exemplary embodiments thereof, it will be understood that various changes in form and details may be made therein without departing from the spirit and scope of the following claims.

INDUSTRIAL USABILITY

The present invention is applicable to a radiator of mobile and the like.

What is claimed is:
1. A motor unit comprising:
   a stator including a plurality of coil units in which electric coil is rolled and magnetized; and
   a rotator having magnetism with a permanent magnet, that rotates due to magnetization of the stator, wherein the plurality of coil units separated radially in an even number includes a plurality of first coil units separated from each other and a plurality of second coil units disposed between the plurality of first coil units, having a length longer than the plurality of first coil units, and having electric coil rolled therein, wherein the stator has a form of a first wiring unit and the plurality of second coil units projected from a boundary unit which is circular at an outermost circumference and having a middle hole which is empty in the middle in a radial form, and wherein the width of the boundary unit from which the plurality of first coil units is projected is wider than the width of the boundary unit from which the plurality of second coil units is projected.
2. The motor unit of claim 1, wherein the boundary unit connects between the first coil unit and the second coil unit and contacts the middle hole, which includes a connecting side extended in a vertical direction to the projecting direction of the second coil unit, wherein; the side of the first coil unit contacting the middle hole includes:
   a slot side which is shorter than the second coil unit;
   a first curved side extending from the slot side in the second coil unit direction; and a second curved side extending from the first curved side so as to be parallel with the second coil unit to meet the connecting side.

3. The motor unit of claim 1, wherein the first and the second coil units are disposed to be separated by 120 degrees from each other.

4. The motor unit of claim 1, wherein the first coil unit includes two end corners facing the rotator which are diagonally oriented.

5. A grill shutter driving device for driving a plurality of grill shutters which are located in a course of an air input comprising:
   a body unit interposed between the plurality of grill shutters;
   a motor unit which is installed inside the body unit generating driving power for driving the grill shutter;
   a control unit controlling generation of driving power of the motor unit; and
   a connection unit providing driving power of the motor unit to the grill shutter, wherein the motor unit includes:
   a stator including a plurality of coil units in which electric coil is rolled and is magnetized; and
   a rotator having magnetism with a permanent magnet and rotating due to magnetization of the stator, wherein the plurality of coil units separated with each other in a radial form with an even number includes a plurality of first coil units separated from each other and a plurality of second coil units arranged between the plurality of first coil units, having a longer length than the first coil unit, and having electric coil rolled therein.

6. The grill shutter driving device of claim 5, wherein the body unit includes at least one fixing guider to fix a position of the stator of the motor unit.

7. The grill shutter driving device of claim 5, wherein the motor unit includes a plurality of decelerating gears for decelerating driving power of the motor unit in multi-steps by engaging in the rotator, and wherein the connection unit includes first and second connection units that go through the body unit and are connected to each decelerating unit on both sides of the body unit.

8. The grill shutter driving device of claim 5, wherein the control unit compares the temperature of the environment in which the grill shutter is located with the predetermined reference value and controls driving power of the motor unit selectively.

9. The grill shutter driving device of claim 5, wherein the control unit is electrically connected to a conductor connected to a power source of the body unit.

10. The grill shutter driving device of claim 5, wherein the stator has a form of a first coil unit and a second coil unit projected from a boundary unit which has a circle outermost and a hole in the middle to the middle direction in a radial form, wherein the width of the boundary unit from which the first coil unit is projected is wider than the width of the boundary unit from which the second coil unit is projected.

11. The grill shutter driving device of claim 10, wherein the boundary unit connecting between the first coil unit and the second coil unit and contacting the middle hole includes a connection side extended in a vertical direction to the projecting direction of the second coil unit, wherein the side of the first coil unit contacting the middle hole includes:
   a slot side which is shorter than the second coil unit;
   a first curved side extending from the slot side in the direction of the second coil unit; and
   a second curved side extending from the first curved side so as to be parallel with the second coil unit to meet the connection side.

12. The grill shutter driving device of claim 5, wherein the first coil unit includes end corners on both sides.

13. A motor unit, comprising:
   a stator including a plurality of coil units in which electric coil is rolled and magnetized; and
   a rotator having magnetism with a permanent magnet, that rotate due to magnetization of the stator, wherein the plurality of coil units separated radially in an even number includes a plurality of first coil units separated from each other and a plurality of second coil units disposed between the plurality of first coil units, having a length longer than the plurality of first coil units, and having electric coil rolled therein, wherein the first and the second coil units are disposed to be separated by 120 degrees from each other.

* * * * *